(12) United States Patent
Small et al.

(10) Patent No.: US 10,915,504 B2
(45) Date of Patent: Feb. 9, 2021

(54) DISTRIBUTED OBJECT-BASED STORAGE SYSTEM THAT USES POINTERS STORED AS OBJECT ATTRIBUTES FOR OBJECT ANALYSIS AND MONITORING

(71) Applicant: Panasas, Inc., Sunnyvale, CA (US)

(72) Inventors: Jason Kenneth Small, Pittsburgh, PA (US); Ben Zion Halevy, Tel-Aviv (IL); Daniel Belov, Pittsburgh, PA (US)

(73) Assignee: PANASAS, INC., Sunnyvale, CA (US)

( * ) Notice: Subject to any disclaimer, the term of this patent is extended or adjusted under 35 U.S.C. 154(b) by 0 days.

(21) Appl. No.: 15/831,083

(22) Filed: Dec. 4, 2017

(65) Prior Publication Data

US 2019/0129978 A1 May 2, 2019

Related U.S. Application Data

(63) Continuation of application No. 15/261,588, filed on Sep. 9, 2016, now abandoned, which is a continuation of application No. 13/082,255, filed on Apr. 7, 2011, now abandoned, which is a continuation of application No. 11/825,921, filed on Jul. 10, 2007, now abandoned, which is a continuation of application No. 10/918,202, filed on Aug. 13, 2004, now abandoned.

(51) Int. Cl.
*G06F 16/182* (2019.01)
*G06F 16/16* (2019.01)
*G06F 16/13* (2019.01)

(52) U.S. Cl.
CPC ............ *G06F 16/183* (2019.01); *G06F 16/13* (2019.01); *G06F 16/16* (2019.01)

(58) Field of Classification Search
None
See application file for complete search history.

(56) References Cited

U.S. PATENT DOCUMENTS

| | | | |
|---|---|---|---|
| 6,643,632 B1 * | 11/2003 | Hiyoshi | G06F 16/11 707/752 |
| 2002/0078244 A1 * | 6/2002 | Howard | G06F 16/1865 709/248 |
| 2002/0169786 A1 * | 11/2002 | Richek | G06F 8/437 |
| 2005/0171960 A1 * | 8/2005 | Lomet | G06F 16/2246 |
| 2005/0177554 A1 * | 8/2005 | Peltonen | G06F 16/328 |
| 2005/0222968 A1 * | 10/2005 | Wayman | G06F 8/71 |

* cited by examiner

*Primary Examiner* — Thu N Nguyen
(74) *Attorney, Agent, or Firm* — Morgan, Lewis & Bockius LLP

(57) ABSTRACT

In a distributed object-based storage system that includes a plurality of object storage devices and one or more clients that access distributed, object-based files from the object storage devices, each of the files being comprised of a plurality of object components residing on different object storage device, systems and methods that use pointers stored as object attributes for file analysis and monitoring.

4 Claims, 1 Drawing Sheet

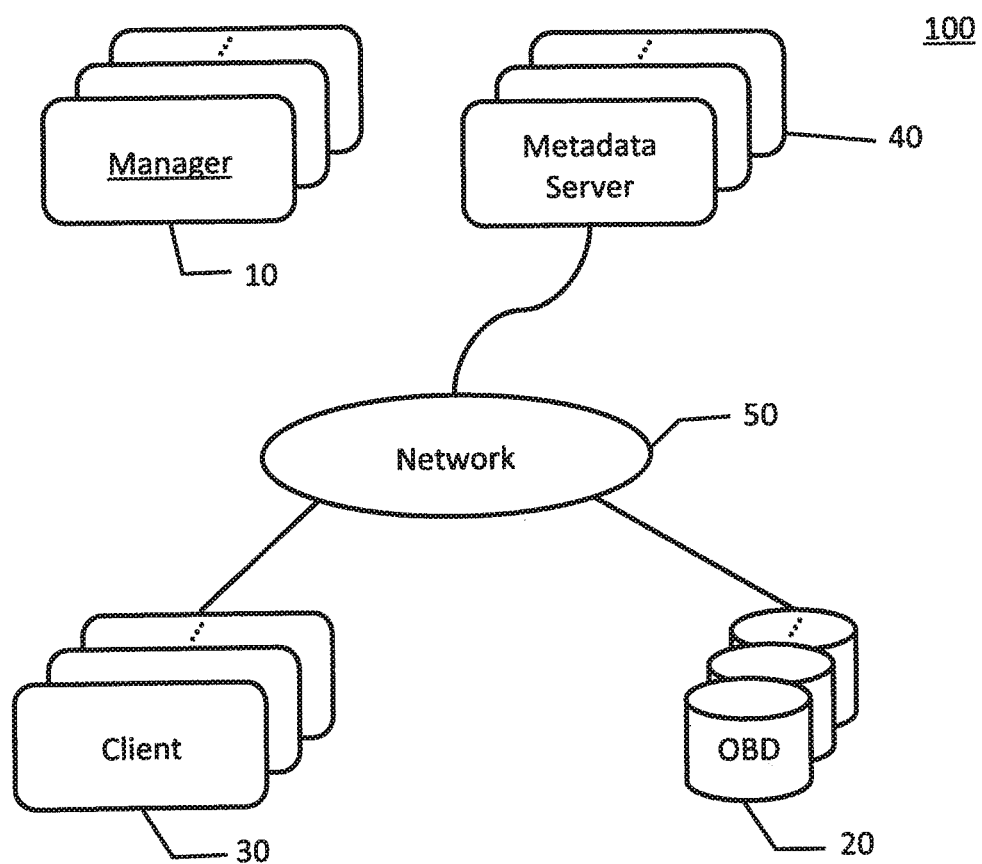

DISTRIBUTED OBJECT-BASED STORAGE SYSTEM THAT USES POINTERS STORED AS OBJECT ATTRIBUTES FOR OBJECT ANALYSIS AND MONITORING

This application is a continuation of pending U.S. application Ser. No. 15/261,588, which was filed on Sep. 9, 2016, which is a continuation of U.S. application Ser. No. 13/082,255, which was filed on Apr. 7, 2011, now abandoned, which is a continuation of U.S. application Ser. No. 11/825,921, which was filed on Jul. 10, 2007, now abandoned, which is a continuation of application Ser. No. 10/918,202, which was filed on Aug. 13, 2004, now abandoned, and are incorporated in their entirety herein by reference.

FIELD OF THE INVENTION

The present invention generally relates to data storage methodologies, and, more particularly, to an object-based methodology that uses pointers stored as object attributes to identify file objects that have missing components, and/or to identify file object components stored on a specific object storage device.

BACKGROUND OF THE INVENTION

With increasing reliance on electronic means of data communication, different models to efficiently and economically store a large amount of data have been proposed. A data storage mechanism requires not only a sufficient amount of physical disk space to store data, but various levels of fault tolerance or redundancy (depending on how critical the data is) to preserve data integrity in the event of one or more disk failures.

In a traditional networked storage system, a data storage device, such as a hard disk, is associated with a particular server or a particular server having a particular backup server. Thus, access to the data storage device is available only through the server associated with that data storage device. A client processor desiring access to the data storage device would, therefore, access the associated server through the network and the server would access the data storage device as requested by the client. By contrast, in an object-based data storage system, each object-based storage device communicates directly with clients over a network. An example of an object-based storage system is shown in co-pending, commonly-owned, U.S. patent application Ser. No. 10/109,998, filed on Mar. 29, 2002, titled "Data File Migration from a Mirrored RAID to a Non-Mirrored XOR-Based RAID Without Rewriting the Data," incorporated by reference herein in its entirety.

Existing object-based storage systems, such as the one described in co-pending application Ser. No. 10/109,998, typically include a plurality of object-based storage devices for storing object components, a metadata server, and one or more clients that access distributed, object-based files on the object storage devices. In such systems, it is typically expensive to identify file objects that need to be reconstructed. For example, a call must initially be made to list (component) objects from each Object-Based Storage Device (OBD). Each OBD in turn would return a list of, for example 500 objects. These lists must then be merged together to make a list of up to 500 (virtual) objects. Reconstruction then requires retrieval of a map (i.e., layout information showing the physical location on the OBDs where each component of an object resides) from one component of each object to determine if any component of the object was on a non-working OBD. Only after these steps were done, could the object be reconstructed. Given an average file size of two components (e.g., 64 k per component) and a typical number of OBDs of 10, only about 11% of the objects for which attributes are retrieved in the reconstruction process need to be reconstructed.

What is needed is an improvement over existing systems that provides a more efficient system and method for identifying file objects that require reconstruction.

SUMMARY OF THE INVENTION

The present invention is directed to a distributed object-based storage system that includes a plurality of object storage devices and one or more clients that access distributed, object-based files from the object storage devices, each of the files being comprised of a plurality of object components residing on different object storage devices. As explained below, the present invention provides several systems and methods that use pointers stored as object attributes for file analysis and monitoring in distributed object-based storage systems.

In accordance with a first aspect, the present invention provides a system and method for detecting files with one or more missing components. For each component of each file, a pointer is stored in an attribute field of the component, wherein the pointer points to a further component of the file. Files with one or more missing components are identified by attempting to traverse the components of each file using the pointers. A file is determined to have one or more missing components if all components associated with the file cannot be traversed using the pointers.

In accordance with a second aspect, the present invention provides a system and method for identifying files containing at least one component on a specific object storage device. For each component of each file, a pointer is stored in an attribute field of the component, wherein the pointer points to a further component of the file. Files with at least one component having, in its attribute field, a pointer that points to a further component residing on the specific object storage device are then identified.

In accordance with a third aspect, the present invention is directed to a system and method for identifying files that are missing components. For at least one component of each file, a count value is stored in an attribute field of the component, wherein the count value corresponds to a maximum number of components for the file. For each file, a list of components in the file is retrieved and an attempt is made to retrieve from an attribute field of at least one component of the file, the count value corresponding to the maximum number of components of the file. For each file, if the count value corresponding to the maximum number of components of the file was successfully retrieved from an attribute field of at least one component of the file, a number of components on the list is compared to the count value in order to determine whether the file has fewer components than the count value. If the number of components on the list is less the count value, the file is flagged as missing at least one component. In one embodiment, a file is also identified as having at least one missing component if the attempt to retrieve the count value from an attribute field of at least one component of the file is unsuccessful.

BRIEF DESCRIPTION OF THE DRAWING

The accompanying drawing, which is included to provide a further understanding of the invention and is incorporated in and constitutes a part of this specification, illustrates embodiments of the invention that together with the description serve to explain the principles of the invention:

FIG. 1 illustrates an exemplary network-based file storage system designed around Object-Based Secure Disks (OBDs).

DETAILED DESCRIPTION OF THE PREFERRED EMBODIMENT

Reference will now be made in detail to the preferred embodiments of the present invention, examples of which are illustrated in the accompanying drawing. It is to be understood that the figures and descriptions of the present invention included herein illustrate and describe elements that are of particular relevance to the present invention, while eliminating, for purposes of clarity, other elements found in typical data storage systems or networks.

FIG. 1 illustrates an exemplary network-based file storage system 100 designed around Object Based Secure Disks (OBDs) 20. File storage system 100 is implemented via a combination of hardware and software units and generally consists of manager software (simply, the "manager") 10, OBDs 20, clients 30 and metadata server 40. It is noted that each manager is an application program code or software running on a corresponding server. Clients 30 may run different operating systems, and thus present an operating system-integrated file system interface. Metadata stored on server 40 may include file and directory object attributes as well as directory object contents. The term "metadata" generally refers not to the underlying data itself, but to the attributes or information that describe that data.

FIG. 1 shows a number of OBDs 20 attached to the network 50. An OBD 20 is a physical disk drive that stores data files in the network-based system 100 and may have the following properties: (1) it presents an object-oriented interface (rather than a sector-oriented interface); (2) it attaches to a network (e.g., the network 50) rather than to a data bus or a backplane (i.e., the OBDs 20 may be considered as first-class network citizens); and (3) it enforces a security model to prevent unauthorized access to data stored thereon.

The fundamental abstraction exported by an OBD 20 is that of an "object," which may be defined as a variably-sized ordered collection of bits. Contrary to the prior art block-based storage disks, OBDs do not export a sector interface at all during normal operation. Objects on an OBD can be created, removed, written, read, appended to, etc. OBDs do not make any information about particular disk geometry visible, and implement all layout optimizations internally, utilizing higher-level information that can be provided through an OBD's direct interface with the network 50. In one embodiment, each data file and each file directory in the file system 100 are stored using one or more OBD objects. Because of object-based storage of data files, each file object may generally be read, written, opened, closed, expanded, created, deleted, moved, sorted, merged, concatenated, named, renamed, and include access limitations. Each OBD 20 communicates directly with clients 30 on the network 50, possibly through routers and/or bridges. The OBDs, clients, managers, etc., may be considered as "nodes" on the network 50. In system 100, no assumption needs to be made about the network topology except that each node should be able to contact every other node in the system. Servers (e.g., metadata servers 40) in the network 50 merely enable and facilitate data transfers between clients and OBDs, but the servers do not normally implement such transfers.

Logically speaking, various system "agents" (i.e., the managers 10, the OBDs 20 and the clients 30) are independently-operating network entities. Manager 10 may provide day-to-day services related to individual files and directories, and manager 10 may be responsible for all file- and directory-specific states. Manager 10 creates, deletes and sets attributes on entities (i.e., files or directories) on clients' behalf (Clients may also set attributes themselves.) Manager 10 also specifies the layout of the data on the OBDs for performance and fault tolerance. "Aggregate" objects are objects that use OBDs in parallel and/or in redundant configurations, yielding higher availability of data and/or higher I/O performance. Aggregation is the process of distributing a single data file or file directory over multiple OBD objects, for purposes of performance (parallel access) and/or fault tolerance (storing redundant information). The aggregation scheme associated with a particular object is stored as an attribute of that object on an OBD 20. A system administrator (e.g., a human operator or software) may choose any aggregation scheme for a particular object. Both files and directories can be aggregated. In one embodiment, a new file or directory inherits the aggregation scheme of its immediate parent directory, by default. A change in the layout of an object may cause a change in the layout of its parent directory. Manager 10 may be allowed to make layout changes for purposes of load or capacity balancing.

The manager 10 may also allow clients to perform their own I/O to aggregate objects (which allows a direct flow of data between an OBD and a client), as well as providing proxy service when needed. As noted earlier, individual files and directories in the file system 100 may be represented by unique OBD objects. Manager 10 may also determine exactly how each object will be laid out—i.e., on which OBD or OBDs that object will be stored, whether the object will be mirrored, striped, parity-protected, etc. Manager 10 may also provide an interface by which users may express minimum requirements for an object's storage (e.g., "the object must still be accessible after the failure of any one OBD").

Each manager 10 may be a separable component in the sense that the manager 10 may be used for other file system configurations or data storage system architectures.

In one embodiment, the topology for the system 100 may include a "file system layer" abstraction and a "storage system layer" abstraction. The files and directories in the system 100 may be considered to be part of the file system layer, whereas data storage functionality (involving the OBDs 20) may be considered to be part of the storage system layer. In one topological model, the file system layer may be on top of the storage system layer.

A storage access module (SAM) (not shown) is a program code module that may be compiled into managers and clients. The SAM includes an I/O execution engine that implements simple I/O, mirroring, and map retrieval algorithms discussed below. The SAM generates and sequences the OBD-level operations necessary to implement system-level I/O operations, for both simple and aggregate objects.

Each manager 10 maintains global parameters, notions of what other managers are operating or have failed, and provides support for up/down state transitions for other managers. A benefit to the present system is that the location information describing at what data storage device (i.e., an OBD) or devices the desired data is stored may be located at a plurality of OBDs in the network. Therefore, a client 30 need only identify one of a plurality of OBDs containing location information for the desired data to be able to access that data. The data is may be returned to the client directly from the OBDs without passing through a manager.

In one embodiment of the present invention, each object (e.g., file or directory) stored in distributed object-based storage system 100 is formed of a plurality of component objects that reside on different OBDs 20. Every component object stored on a given OBD 20 has an associated pointer that is stored as an attribute of the component object on the given OBD 20. Each such pointer 'points' to the next component in the object, with the last component pointing back to the first. In this way, the pointers form a ring. As an example, if an object is composed of three components, A, B, C that are stored respectively on OBD1, OBD2, OBD3, the pointer stored as an object attribute of component A on OBD1 would have the value OBD2, the pointer stored as an object attribute of component B on OBD2 would have the value OBD3, and the pointer stored as an object attribute of component C on OBD3 would have the value OBD1. As explained more fully below, if one of the OBDs fails, the pointers now provide an efficient way of finding which objects were effected by the failure. For example, if OBD1 fails, manager 10 can perform a list attributes operation on each remaining OBD (i.e., OBD2 and OBD3 in the example) and analyze the results in order to quickly identify those objects that have pointers of value OBD1. Use of the pointers streamlines the process of identifying objects on OBD1 that require reconstruction, and represents an improvement over prior systems by eliminating the need to retrieve attributes for all objects in the system (e.g., maps for all objects in the system) in order to identify objects on the failed device (e.g., OBD1.)

The aforementioned pointers may be used for performing other object analysis and monitoring functions. For example, the pointers may be used by manager 10 to perform detection of files with one or more missing components. In the embodiment, manager 10 attempts to traverse the components of each file object using the pointers. If manager 10 is unable to traverse the "ring" formed by the pointers of a given file object, manager 10 determines that the given object is missing one or more component objects and optionally flags the file object for reconstruction.

The pointers may be used in a further way to identify file objects that are missing components. In this embodiment, for at least one component (stored on a given OBD 20) of each file object, a count value is stored (on the given OBD 20) in an attribute field of the component. The count value corresponds to a maximum number of components for the file. In order to identify file objects that are missing components, manager 10 retrieves a list of components in each file in the system. For each file in the system, manager 10 also attempts to retrieve from an attribute field associated with each component of the file, the count value corresponding to the maximum number of components of the file. If manager 10 successfully retrieves the count value for a given file, the number of components on the list (i.e., the number of components of the file previously retrieved by manager 10) is compared to the count value. If the number of components on the list is less the count value, manager 10 flags the file as having a metadata inconsistency. In a further embodiment, manager 10 also identifies a file as having at least one missing component if the attempt to retrieve the count value from an attribute field of a component of the file was unsuccessful.

Finally, it will be appreciated by those skilled in the art that changes could be made to the embodiments described above without departing from the broad inventive concept thereof. It is understood, therefore, that this invention is not limited to the particular embodiments disclosed, but is intended to cover modifications within the spirit and scope of the present invention as defined in the appended claims.

What is claimed is:

1. In a distributed object-based storage system that includes a plurality of object storage devices, and one or more clients that access distributed, object-based files from the object storage devices, each of said files being comprised of a plurality of object components residing on different object storage devices, a method for identifying files that are missing components, comprising:

for at least one component of each file, storing on the object storage device storing the component a single pointer having a count value in an attribute field of the component, wherein the count value of the single pointer corresponds to a maximum number of components for the file, and wherein the single pointer points to a further component of the file such that a last single component points back to a first single component to form a ring, and the last single component is different from the first single component, and the single pointer in the last component includes a value of the first component; and for each file, using at least one network node to retrieve a list of components in the file and attempt to retrieve from an attribute field of at least one component of the file, the count value of the single pointer corresponding to the maximum number of components of the file; and for each file, if the count value of the single pointer corresponding to the maximum number of components of the file was successfully retrieved from an attribute field of at least one component of the file, using at least one network node to compare the number of components on the list to the count value of the single pointer and determine that the file has the missing components if the file has fewer components than the count value of the single pointer.

2. The method of claim 1, wherein a file is identified as having a metadata inconsistency if the attempt to retrieve the count value from an attribute field of at least one component of the file is unsuccessful.

3. In a distributed object-based storage system that includes a plurality of object storage devices, and one or more clients that access distributed, object-based files from the object storage devices, each of said files being comprised of a plurality of object components residing on different object storage devices, a system for identifying files that are missing components, comprising:

at least one server that, for at least one component of each file, stores on the object storage device storing the component a single pointer having a count value in an attribute field of the component, wherein the count value of the single pointer corresponds to a maximum number of components for the file, and wherein the single pointer points to a further component of the file such that a last single component points back to a first single component to form a ring, and the last single component is different from the first single component, and the single pointer in the last component includes a value of the first component; and wherein, for each file, the at least one server retrieves a list of components in the file and attempts to retrieve from an attribute field of at least one component of the file the count value corresponding to the maximum number of components of the file; and wherein, for each file, the at least one server compares the number of components on the list to the count value of the single pointer and determines that the file has the missing components if the file has fewer components than the count value.

4. The system of claim 3, wherein the at least one server identifies a file as having at least one missing component if the attempt to retrieve the count value from an attribute field of at least one component of the file is unsuccessful.

\* \* \* \* \*